(12) United States Patent
Flake et al.

(10) Patent No.: US 8,429,040 B2
(45) Date of Patent: Apr. 23, 2013

(54) FACILITATING COMPENSATION ARRANGEMENTS FOR DATA BROKERING

(75) Inventors: Gary W. Flake, Bellevue, WA (US); Royce A. Levien, Lexington, MA (US); Robert W. Lord, Seattle, WA (US); William Henry Mangione-Smith, Kirkland, WA (US); Richard F. Rashid, Redmond, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

(*) Notice: Subject to any disclaimer, the term of this patent is extended or adjusted under 35 U.S.C. 154(b) by 872 days.

(21) Appl. No.: 12/217,138

(22) Filed: Jun. 30, 2008

(65) Prior Publication Data

US 2009/0327149 A1    Dec. 31, 2009

(51) Int. Cl.
*G06Q 40/00* (2012.01)

(52) U.S. Cl.
USPC ............. 705/32; 705/34; 709/224; 707/758

(58) Field of Classification Search ............ 705/34; 709/224; 711/167; 707/758
See application file for complete search history.

(56) References Cited

U.S. PATENT DOCUMENTS

| | | | |
|---|---|---|---|
| 4,870,591 A | 9/1989 | Cicciarelli et al. | |
| 4,961,224 A | 10/1990 | Yung | |
| 4,962,532 A | 10/1990 | Kasiraj et al. | |
| 5,768,521 A * | 6/1998 | Dedrick ................ | 709/224 |
| 5,884,270 A | 3/1999 | Walker et al. | |
| 6,061,692 A | 5/2000 | Thomas et al. | |
| 6,061,789 A | 5/2000 | Hauser et al. | |
| 6,338,050 B1 | 1/2002 | Conklin et al. | |
| 6,735,601 B1 | 5/2004 | Subrahmanyam | |
| 6,886,000 B1 | 4/2005 | Aggarwal | |
| 6,961,562 B2 | 11/2005 | Ross | |
| 7,269,664 B2 | 9/2007 | Hutsch | |
| 7,801,905 B1 * | 9/2010 | Singh et al. ................ | 707/758 |
| 7,835,943 B2 | 11/2010 | Cheung et al. | |
| 7,941,436 B2 | 5/2011 | Popescul et al. | |
| 2001/0032210 A1 | 10/2001 | Frank et al. | |
| 2001/0049681 A1 | 12/2001 | Bova | |
| 2001/0051940 A1 | 12/2001 | Soulanille | |
| 2001/0052761 A1 | 12/2001 | Taniguchi et al. | |
| 2002/0004727 A1 | 1/2002 | Knaus et al. | |
| 2002/0010679 A1 | 1/2002 | Felsher | |
| 2002/0099605 A1 | 7/2002 | Weitzman et al. | |
| 2002/0143596 A1 | 10/2002 | Carmody | |
| 2003/0033161 A1 | 2/2003 | Walker et al. | |
| 2003/0163416 A1 | 8/2003 | Kitajima | |
| 2003/0220844 A1 | 11/2003 | Marnellos et al. | |
| 2003/0225989 A1 * | 12/2003 | Licalsi ................... | 711/167 |
| 2004/0068460 A1 | 4/2004 | Feeley et al. | |
| 2004/0073570 A1 | 4/2004 | Janakiraman et al. | |
| 2004/0167845 A1 | 8/2004 | Corn et al. | |

(Continued)

OTHER PUBLICATIONS

U.S. Appl. No. 12/220,918, Flake et al.

(Continued)

*Primary Examiner* — Samica L Norman

(57) ABSTRACT

Systems and methods for data brokering, and more specifically, data brokering regarding a data provider's search-related activities, are described. In particular implementations, various aspects of facilitating a compensation arrangement between a data provider and a data consumer regarding one or more data-provider-related search activities are described.

77 Claims, 11 Drawing Sheets

U.S. PATENT DOCUMENTS

| | | | |
|---|---|---|---|
| 2005/0021359 | A1 | 1/2005 | McKinney |
| 2005/0097024 | A1 | 5/2005 | Rainey |
| 2005/0197972 | A1 | 9/2005 | Kettner et al. |
| 2006/0155842 | A1 | 7/2006 | Yeung et al. |
| 2007/0130005 | A1 | 6/2007 | Jaschke |
| 2007/0258460 | A1 | 11/2007 | Momtahan et al. |
| 2008/0120162 | A1 | 5/2008 | Carmody |
| 2008/0215493 | A1 | 9/2008 | Ong et al. |
| 2008/0228403 | A1 | 9/2008 | Robertsson |
| 2009/0106084 | A1 | 4/2009 | Or |
| 2010/0211490 | A1* | 8/2010 | Itoh et al. .............. 705/34 |
| 2010/0250547 | A1 | 9/2010 | Grefenstette et al. |
| 2011/0276452 | A1 | 11/2011 | Stephens |

OTHER PUBLICATIONS

U.S. Appl. No. 12/221,465, Flake et al.

U.S. Appl. No. 12/221,203, Flake et al.

U.S. Appl. No. 12/229,506, Flake et al.

Zaihan Yang and Chengfei Liu, Implementing a Flexible Compensation Mechanism for Business Processes in Web Service Environment, IEEE International Conference on Web Services (ICWS'06)—Jan. 2006.

PALAMIDA, Security Implications of Web 2.0 Services, www.palamida.com—Mar. 2008.

Tim O'Reilly, What is Web 2.0, http://r2computing.blogspot.com/2008/04/web-20-democracy-of-ideas.html—Sep. 30, 2005.

CISCO, Web 2.0 in the Enterprise Cisco IT helps to build a scalable, secure communications and collaboration platform, Cisco on Cisco: Inside Cisco IT Trends in IT—Mar. 2008.

Claye Stokes, Small Business Web Design Guide—Part I, www.clayestokes.com—Jul. 16, 2008.

Dustin Whittle, Yahoo, Web 2.0 Expo—printed on Nov. 19, 2008.

Jesse James Garrett, Ajax: A New Approach to Web Applications Recent, http://adaptivepath.com/ideas/essays/archives/000385.php—Feb. 18, 2005.

William White, RIA Applications and the Web Presentation, Yahoo! Media Innovation Group—printed on Nov. 19, 2008.

Philip McCarthy, Software development consultant, Independent, Ajax for Java developers: Build dynamic Java applications, http://www-128.ibm.com/developerworks/library/j-ajax1—Sep. 20, 2005.

Dion Hinchcliffe, Building Next Generation Web 2.0 Applications, www.web20university.com—Apr. 2008.

James Snell, Call Soap Web Services with Ajax Part 1: Build the Web Services Client, http://www-128.ibm.com/developerworks/webservices/library/ws-wsajax—Sep. 18, 2008.

Paul Hammond and Simon Wilson, d.Construct 2006, http://www.paulhammond.org/2006/dconstruct—Sep. 8, 2006.

Steven Webster, Macromedia Flash MX Professional 2004, http://store2.adobe.com/devnet/flash/articles/ria_dataservices.html—Sep. 18, 2008.

Aral Balkan, Mash my Flex up, aralbalkan.com—printed on Nov. 19, 2008.

O'Reilly Media Inc., Mastering Ajax, Part 1: Introduction to Ajax, http://www.ibm.com/developerworks/web/library/wa-ajaxintro1.html—Dec. 6, 2005.

O'Reilly Media Inc., Mastering Ajax, Part 2: Make asynchronous requests with JavaScript and Ajax, http://www-128.ibm.com/developerworks/java/library/wa-ajaxintro2/index.html—Jan. 17, 2006.

Jesse James Garrett, OK/Cancel, http://www.ok-cancel.com/archives/article/2005/09/why-ajax-matters-now.html—Sep. 16, 2005.

O'Reilly Media, Spreading the knowledge of innovators—printed on Nov. 19, 2008.

Satayam, Service-Oriented Architecture (SOA)—2008.

Microsoft Corporation, XML Developer Center, http://msdn.microsoft.com/en-us/xml/default.aspx—printed on Nov. 19, 2008.

Karl Bishop and Doug Phillips, Using Ajax with WebSphere Portal, http://www.ibm.com/developerworks/websphere/library/techarticles/0606_bishop/0606_bishop.html—Jun. 28, 2006.

O'R Eilly Radar, Web 2.0 Principles and Best Practices, Tim O'Reilly, Executive Summary—Fall 2006.

James Snell, Call SOAP Web services with Ajax, Part 1: Build the Web services client, ibm.com/developerWorks—Oct. 11, 2005.

* cited by examiner

332 FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

352 ARRANGING FOR COMPENSATION TO BE RECEIVED FROM A DATA CONSUMER IN EXCHANGE FOR DATA GATHERING RELATED TO THE DATA PROVIDER

354 ARRANGING FOR A PLURALITY OF COMPENSATION LEVELS TO BE RECEIVED FROM A DATA CONSUMER IN EXCHANGE FOR DATA GATHERING RELATED TO AT LEAST ONE OF AN AFFINITY-RELATED INFORMATION, A HEALTH-RELATED INFORMATION, A CONSUMER-RELATED INFORMATION, OR A PERSONAL-CHARACTERISTIC INFORMATION

356 ARRANGING FOR A RELATIVELY HIGHER LEVEL OF COMPENSATION TO BE RECEIVED FROM A DATA CONSUMER IN EXCHANGE FOR DATA GATHERING RELATED TO AN AFFINITY-RELATED INFORMATION ASSOCIATED WITH THE DATA PROVIDER IN COMPARISON WITH DATA GATHERING RELATED TO ANOTHER INFORMATION TYPE

358 ARRANGING FOR A RELATIVELY HIGHER LEVEL OF COMPENSATION TO BE RECEIVED FROM A DATA CONSUMER IN EXCHANGE FOR DATA GATHERING RELATED TO A HEALTH-RELATED INFORMATION ASSOCIATED WITH THE DATA PROVIDER IN COMPARISON WITH DATA GATHERING RELATED TO ANOTHER INFORMATION TYPE

360 ARRANGING FOR A RELATIVELY HIGHER LEVEL OF COMPENSATION TO BE RECEIVED FROM A DATA CONSUMER IN EXCHANGE FOR DATA GATHERING RELATED TO A CONSUMER-RELATED INFORMATION ASSOCIATED WITH THE DATA PROVIDER IN COMPARISON WITH DATA GATHERING RELATED TO ANOTHER INFORMATION TYPE

362 ARRANGING FOR A RELATIVELY HIGHER LEVEL OF COMPENSATION TO BE RECEIVED FROM A DATA CONSUMER IN EXCHANGE FOR DATA GATHERING RELATED TO A PERSONAL-CHARACTERISTIC-RELATED INFORMATION ASSOCIATED WITH THE DATA PROVIDER IN COMPARISON WITH DATA GATHERING RELATED TO ANOTHER INFORMATION TYPE

FACILITATING A COMPENSATION ARRANGEMENT BETWEEN A DATA PROVIDER AND A DATA CONSUMER REGARDING ONE OR MORE DATA-PROVIDER-RELATED SEARCH ACTIVITIES

332 ARRANGING FOR COMPENSATION TO BE RECEIVED FROM A DATA CONSUMER IN EXCHANGE FOR DATA GATHERING RELATED TO THE DATA PROVIDER

384 ARRANGING FOR COMPENSATION TO BE RECEIVED FROM A DATA CONSUMER IN EXCHANGE FOR DATA GATHERING RELATED TO INFORMATION PRESUMED TO HAVE BEEN EYEBALLED BY THE DATA PROVIDER

386 ARRANGING FOR COMPENSATION TO BE RECEIVED FROM A DATA CONSUMER IN EXCHANGE FOR DATA GATHERING RELATED TO A PARTICULAR TYPE OF INFORMATION PRESUMED TO HAVE BEEN EYEBALLED BY THE DATA PROVIDER

388 ARRANGING FOR COMPENSATION TO BE RECEIVED FROM A DATA CONSUMER IN EXCHANGE FOR DATA GATHERING RELATED TO AN AMOUNT OF TIME PRESUMED TO HAVE BEEN SPENT EYEBALLING THE INFORMATION BY THE DATA PROVIDER

390 ARRANGING FOR COMPENSATION TO BE RECEIVED FROM A DATA CONSUMER IN EXCHANGE FOR DATA GATHERING RELATED TO A QUANTITY OF DATA PRESUMED TO HAVE BEEN EYEBALLED BY THE DATA PROVIDER

392 ARRANGING FOR COMPENSATION TO BE RECEIVED FROM A DATA CONSUMER IN EXCHANGE FOR DATA GATHERING PRESUMABLY RELATED TO REPEATED EYEBALLING BY THE DATA PROVIDER

FACILITATING COMPENSATION ARRANGEMENTS FOR DATA BROKERING

FIELD OF THE DISCLOSURE

The present disclosure relates generally to data brokering, and more specifically, to facilitating compensation arrangements for data brokering regarding a data provider's search-related activities.

BACKGROUND

Individuals that engage in on-line activities, such as on-line search-related activities, typically generate information that may have value to other entities. Such information has often been surreptitiously monitored and gathered by various interested parties who, in turn, may make use of the information for commercial purposes (e.g. advertising).

SUMMARY

The present disclosure teaches systems and methods for data brokering, and more specifically, data brokering regarding a data provider's search-related activities. In particular implementations, the present disclosure teaches aspects of facilitating a compensation arrangement between a data provider and a data consumer regarding one or more data-provider-related search activities.

BRIEF DESCRIPTION OF THE DRAWINGS

FIGS. 3 through 10 are flowcharts of methods of facilitating a compensation arrangement between a data provider and a data consumer regarding one or more data-provider-related search activities (FIG. 1) in accordance with various implementations of the present disclosure.

DETAILED DESCRIPTION

Techniques for brokering data regarding a data provider's search-related activities are disclosed. It should be appreciated that many specific details of certain implementations are set forth in the following description, and in FIGS. 1 through 11, to provide a thorough understanding of such implementations. One skilled in the art will understand from the teachings of the present disclosure, however, that the present disclosure may have other possible implementations, and that such other implementations may be practiced with/without some of the details set forth in the following description.

Figure 1:
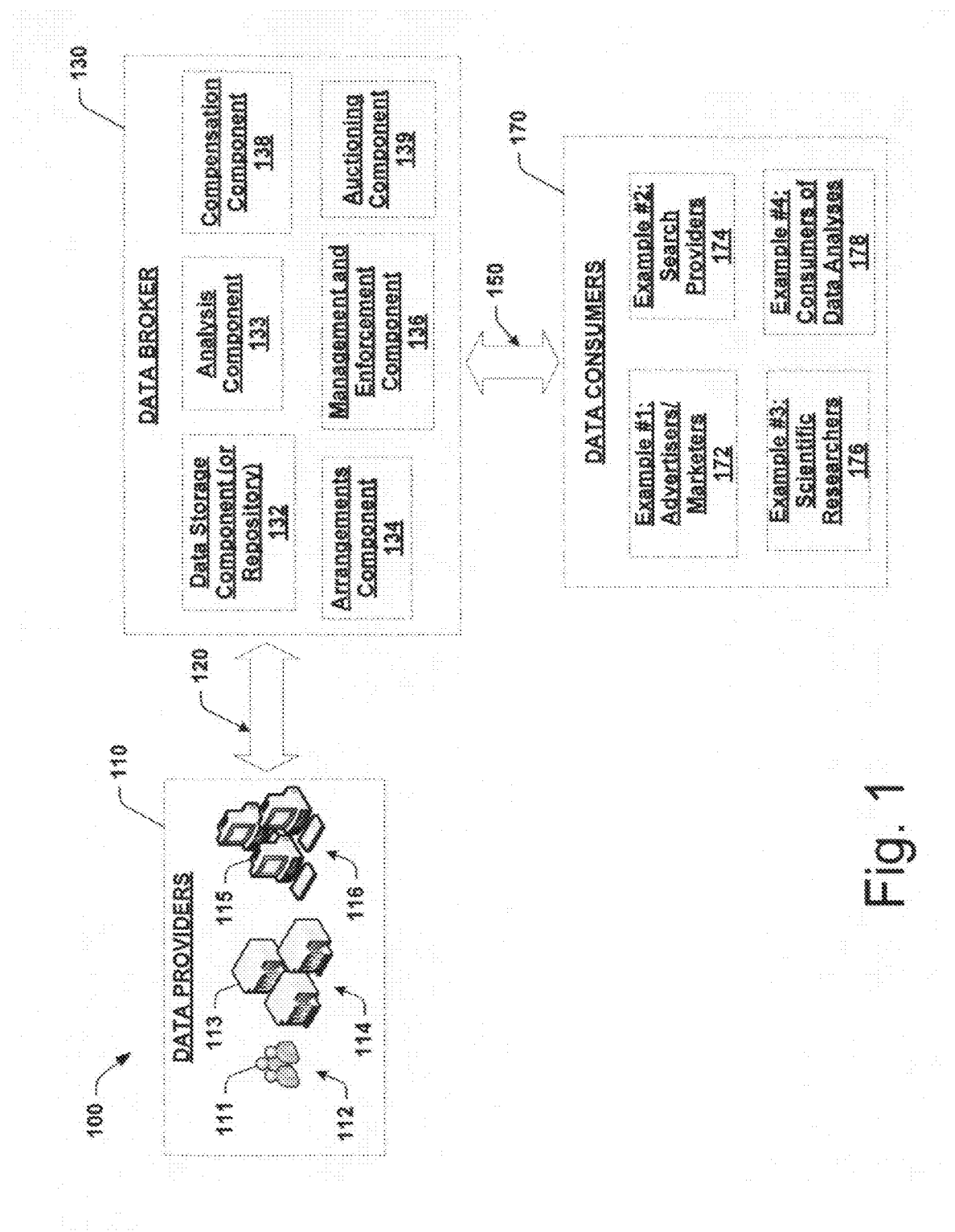
FIG. 1 is a schematic view of a representative environment for brokering data in accordance with an implementation of the present disclosure.

FIG. 1 is a schematic view of a representative environment 100 in accordance with an implementation of the present disclosure. In this implementation, the environment 100 includes one or more data providers 110, and one or more data consumers 170 who use the data generated by the data providers 110. In general, the data (or data products) generated by the data providers 110 may include a wide variety of information, including keywords, phrases, search terms, Universal Resource Locator (URL) data, browsing history, eye-balling history, time and quantity information, selection history, affinity-related information, health-related information, consumer-related information, personal-characteristic information, and any other suitable information.

As shown in FIG. 1, the data providers 110 may include a variety of different providers and provider types. For example, in various implementations, the data providers 110 may include an individual 111, a group of individuals 112, an entity 113, a group of entities 114, a device 115, or a group of devices 116. In general, virtually any individual, entity, device, or groups thereof, may be a member of the data providers 110. For example, in various implementations, the individual 111 (or group of individuals 112) may include a computer user, consumer, person from a particular demographic group (e.g. age, gender, race, profession, religion, orientation, preference, geographic area, etc.), a particular bellwether or trendsetting individual (e.g. individual with popular ideas or tastes, athlete, performing artist, etc.), or any other suitable person. Similarly, in various implementations, the entity 113 (or group of entities 114) may include a professional organization (e.g. Institute of Electrical and Electronics Engineers (IEEE), American Automobile Association (AAA), American Association of Retired Persons (AARP), etc.), company, university, union (e.g. United Auto Workers (UAW), International Affiliation of Writers Guilds, etc.), consumer group (e.g. members of Costco®, Sam's Club®, Starwood®, etc.), club, association, (e.g. Boy Scouts of America, etc.), or any other suitable type of entity. Also, in various implementations, the device 115 (or group of devices 116) may include, for example, a computer, networking device, processor, personal communication device, or any other suitable type of device. Of course, other individuals, entities, and devices that may serve as data providers 110 may be conceived. More specifically, in particular implementations, any individual, entity, or device whose data may serve as an indicator of future consumption may suitably qualify such individual, entity, or device as a data provider 110.

The data consumers 170 may also include a variety of different consumers and consumer types. For example, in some specific implementations, the data consumers 170 may include advertisers or marketers 172, search providers 174, scientific researchers 176, consumers of data analyses 178, or any other suitable consumers. Data consumers 170 may also include any and all of the individuals, entities, and devices (or groups thereof) referenced above as data providers 110, or any other suitable types of data consumers. It will be appreciated that the data providers 110 and the data consumers 170 are not necessarily mutually exclusive groups, and that an entity may in some instances be a data provider, and in other instances a data consumer, or may even be both at the same time.

With continued reference to FIG. 1, a data broker 130 operatively communicates with the one or more data providers 110 and the one or more data consumers 170. Communications (or interactions) 120 between the data broker 130 and the one or more data providers 110 may include, for example, negotiation activities (e.g. offers, rejections, counteroffers, terms, conditions, provisions, etc.) which may lead to the establishment of one or more data provision agreements between the data providers 110 and the data broker 130. The communications 120 may also include communications relating to performance of established data provision agreements, including, for example, data transmissions, data receptions, access records, compensation exchanges, accounting exchanges, or any other suitable communications (or interactions) relating to performance.

Similarly, communications (or interactions) 150 between the data broker 130 and the one or more data consumers 170 may include, for example, negotiation activities (e.g. offers, rejections, counteroffers, terms, conditions, provisions, etc.) which may lead to the establishment of one or more data use agreements between the data providers 110 and the data broker 130. Again, such communications 150 may also include communications relating to performance of established data use agreements, including, for example, data transmissions, data receptions, access records, compensation exchanges, accounting exchanges, or any other suitable communications (or interactions) relating to performance.

As further shown in FIG. 1, in some implementations, the data broker 130 may include one or more components that are operable to perform various functions and operations associated with the data broker 130. For example, the data broker 130 may include a data storage component 132, an analysis component 133, an arrangements component 134, a management and enforcement component 136, a compensation component 138, and an auctioning component 139. The various components 132-139 of the data broker 130 may communicate and exchange information as needed to perform the functions and operations described herein. Each of the components 132-139 may be implemented using software, hardware, firmware, or any suitable combinations thereof. In alternate implementations, one or more of the components 132-139 may be combined with other components, or may simply be eliminated.

The data storage component 132 may be operable to receive and store data provided by the data providers 110. The data storage component 132 may organize the data by type, profile, data provider, value, or using any other suitable organizational structure. In some implementations, the data storage component 132 may also store information relating to the communications 120, 150 between the data broker 130 and the data providers 110 and the data consumers 170. For example, the data storage component may store information relating to negotiation activities (e.g. offers, rejections, counteroffers, terms, conditions, provisions, etc.), established data provision agreements, established data use agreements, and information to performance of such established agreements (e.g. data transmissions, data receptions, access records, compensation exchanges, accounting exchanges, etc.).

The analysis component 133 may be operable to perform a variety of functions and operations. For example, the analysis component 133 may be operable to run an analysis or mathematical model for a data consumer to test a theory, to determine a potential value of the data, to develop a new analysis model, to filter or glean relevant data from a quantity of raw data, or to perform any other suitable analysis. The analysis component 133 may also allow the data consumer 170 (or the data broker 130) to perform any desired mathematical manipulation of the data.

Similarly, the arrangements component 134 may be operable to perform a variety of functions and operations. For example, in some implementations, the arrangements component 134 may create proposals, propose terms, receive offers to provide data, receive offers to consume data, identify potential data providers, identify potential data consumers, and perform other functions and operations associated with making arrangements with the data providers 110 and the data consumers 170. As described more fully below, the arrangements component 134 may also be operable to perform negotiations of one or more of data provision agreements and data use agreements.

With continued reference to FIG. 1, the management and enforcement component 136 may the operable to monitor a performance of one or more of the data providers 110, the data broker 130, and the data consumers 170 in accordance with the arrangements established by the arrangements component 134. More specifically, the management and enforcement component 136 may perform one or more of monitoring functions, recordkeeping functions (e.g. access periods, access volumes, sales volume, network traffic, URL hits, etc.), access control functions (e.g. data rights management, license terms, etc.), notification functions, or any other suitable functions in accordance with the terms and conditions of the agreements establish between the parties.

The compensation component 138 may be operable to determine the various amounts of compensation due from the data consumers 170, and owing to the data providers 110. The compensation component 138 may, for example, receive one or more terms of compensation established by the arrangements component 134, and may also receive performance information gathered by the management and enforcement component 136. In some implementations, the compensation component 138 is operable to manage and implement a variety of compensation types, including upfront compensation, future compensation, contingent or conditional compensation, royalty-based compensation, auctioning-based compensation, non-monetary compensation, or any other suitable types of compensation, as described more fully below.

The auctioning component 139 may be operable to perform functions and operations associated with auctioning of data. For example, in some implementations, the auctioning component 139 may function in a manner substantially similar to the arrangements component 134, but may be operable to do so in an auctioning format. Thus, the auctioning component 139 may be operable to offer data products to a plurality of potential data consumers, to receive bids for use of the data, to evaluate the bids, to negotiate the terms and conditions, and to perform any other suitable auction-related functions.

Following are a series of flowcharts depicting embodiments of processes. For ease of understanding, the flowcharts are organized such that the initial flowcharts present embodiments via an overall "big picture" viewpoint, and thereafter the following flowcharts present alternate embodiments and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 2:
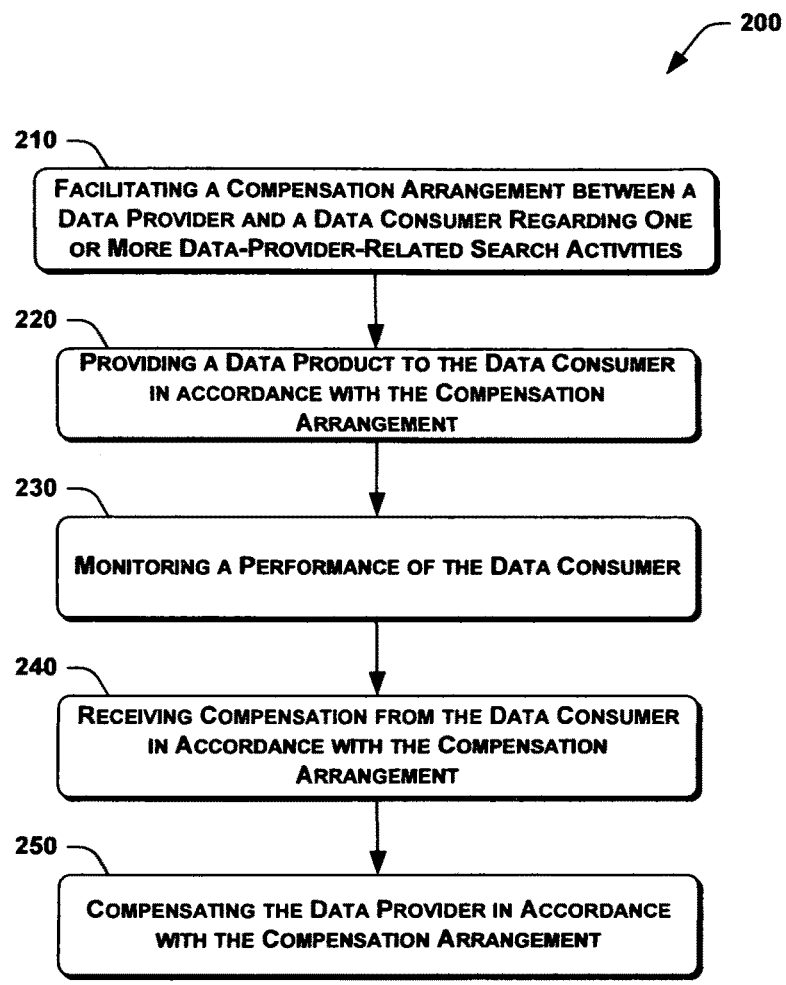
FIG. 2 is a flowchart of a method of brokering data in accordance with an implementation of the present disclosure.

FIG. 2 is a flowchart of a method of brokering data 200 in accordance with another implementation of the present disclosure. In this implementation, the method 200 includes facilitating a compensation arrangement between a data provider and a data consumer regarding one or more data-provider-related search activities at 210. At 220, a data product is provided to the data consumer in accordance with the compensation arrangement. A performance of the data consumer is monitored at 230, and compensation is received from the data consumer in accordance with the compensation arrangement at 240. At 250, the data provider is compensated in accordance with the compensation arrangement.

It will be appreciated that the facilitating of a compensation arrangement between a data provider and a data consumer regarding one or more data-provider-related search activities, performed at 210 of the method 200 of FIG. 1, may be implemented in a variety of ways. More specifically, FIGS. 3 through 10 show flowcharts of various implementations of facilitating a compensation arrangement between a data provider and a data consumer regarding one or more data-provider-related search activities in accordance with the present disclosure. Accordingly, various implementations will now be described with reference to FIGS. 3 through 10.

Figure 3:
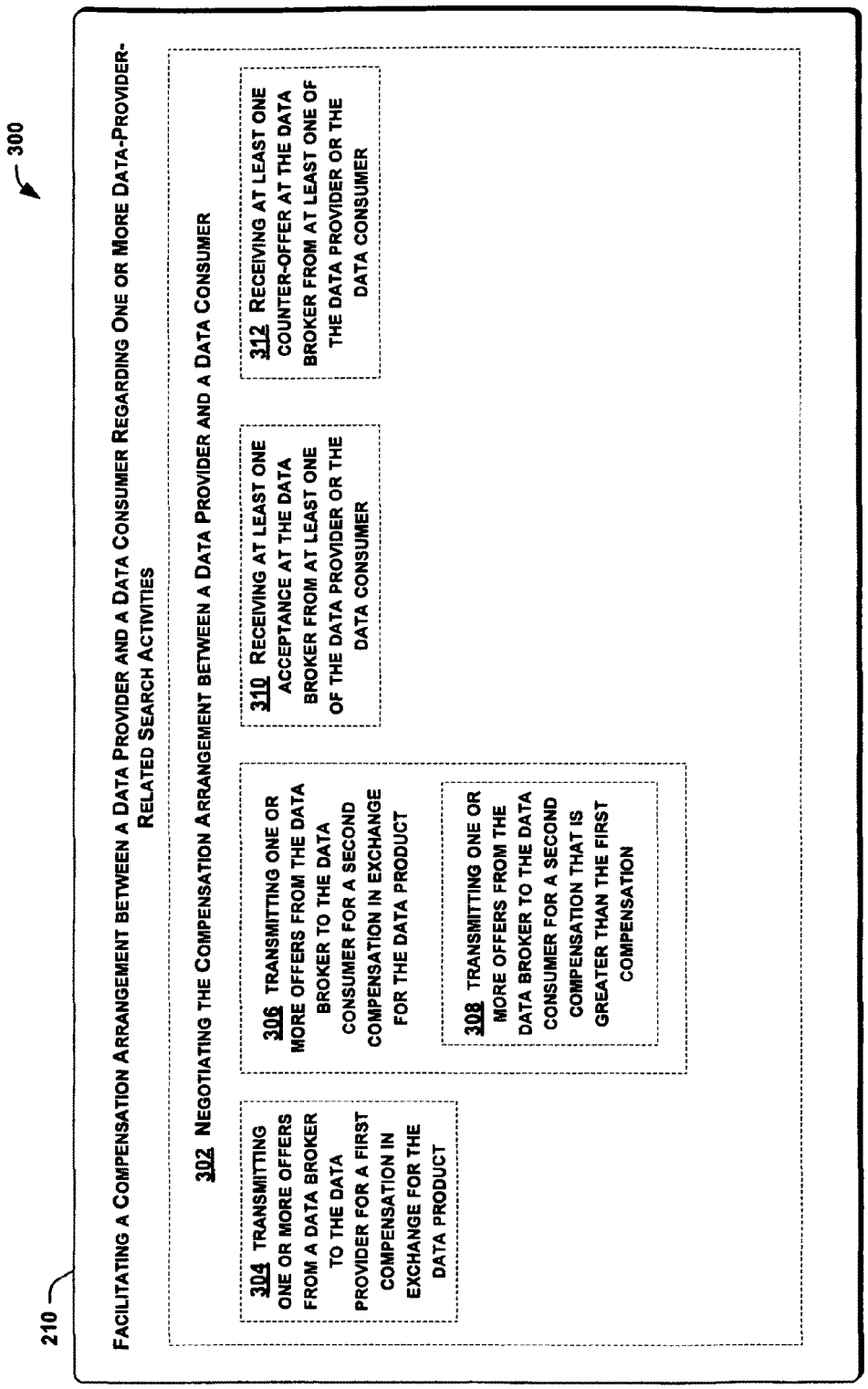

For example, in the implementation 300 shown in FIG. 3, facilitating a compensation arrangement between a data provider and a data consumer regarding one or more data-provider-related search activities (at 210 of FIG. 1) may include negotiating the compensation arrangement between the data provider and the data consumer at 302. In some implementations, negotiating the compensation arrangement between the data provider and the data consumer (at 302) may include transmitting one or more offers from a data broker to the data provider for a first compensation in exchange for a data product at 304, and transmitting one or more offers from the data broker to the data consumer for a second compensation in exchange for the data product at 306. More specifically, in some implementations, transmitting one or more offers from the data broker to the data consumer for a second compensation in exchange for the data product at 306 may include transmitting one or more offers from the data broker to the data consumer for the second compensation that is greater than the first compensation at 308.

As further shown in FIG. 3, in some implementations, negotiating the compensation arrangement between the data provider and the data consumer (at 302) may include receiving at least one acceptance at the data broker from at least one of the data provider or the data consumer at 310. Similarly, in some implementations, negotiating the compensation arrangement between the data provider and the data consumer (at 302) may include receiving at least one counter-offer at the data broker from at least one of the data provider or the data consumer at 312.

Figure 4:
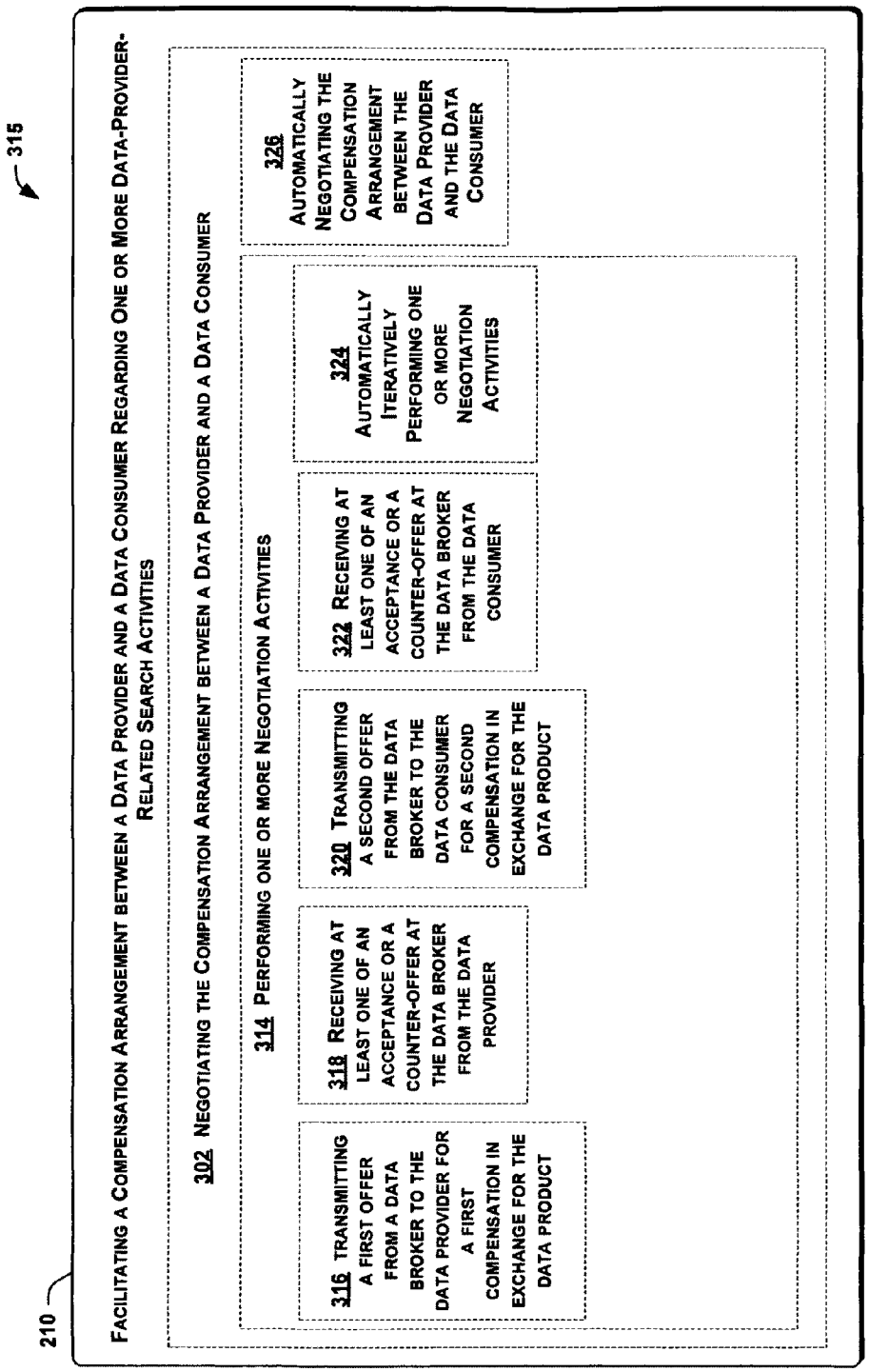

As shown in FIG. 4, in an implementation 315, negotiating the compensation arrangement between the data provider and the data consumer (at 302) may include performing one or more negotiation activities at 314. Performing one or more negotiation activities (at 314) may include at least one of: transmitting a first offer from a data broker to the data provider for a first compensation in exchange for the data product at 316; receiving at least one of an acceptance or a counter-offer at the data broker from the data provider at 318; transmitting a second offer from the data broker to the data consumer for a second compensation in exchange for the data product at 320; or receiving at least one of an acceptance or a counter-offer at the data broker from the data consumer at 322. In some implementations, performing one or more negotiation activities (at 314) may include automatically iteratively performing one or more negotiation activities at 324. Similarly, in still further implementations, negotiating the compensation arrangement between the data provider and the data consumer (at 302) may include automatically negotiating the compensation arrangement between the data provider and the data consumer at 326.

In some implementations, terms and conditions associated with compensation aspects may be facilitated. For example, as shown in FIG. 5, in an implementation 330, facilitating a compensation arrangement between a data provider and a data consumer regarding one or more data-provider-related search activities (at 210 of FIG. 1) may include arranging for compensation to be received from a data consumer in exchange for data gathering related to the data provider at 332.

In some implementations, arranging for compensation to be received from a data consumer in exchange for data gathering related to the data provider (at 332) may include arranging for compensation to be received from a data consumer in exchange for data gathering related to at least one networking device (e.g. a computer, server, switch, firewall, security appliance, cellular phone, a personal data assistant (PDA), television, etc.) associated with the data provider at 334. In other implementations, arranging for compensation to be received from a data consumer in exchange for data gathering related to the data provider (at 332) may include arranging for compensation to be received from a data consumer in exchange for data gathering related to at least one computing device (e.g. a desktop computer, laptop computer, notebook computer, mainframe computer, server, etc.) associated with the data provider at 336. In further implementations, arranging for compensation to be received from a data consumer in exchange for data gathering related to the data provider (at 332) may include arranging for compensation to be received from a data consumer in exchange for data gathering related to at least one personal communications device 338 (e.g. a cellular phone, a personal data assistant (PDA), a navigational device, a laptop, etc.) associated with the data provider at 336.

Figure 5:
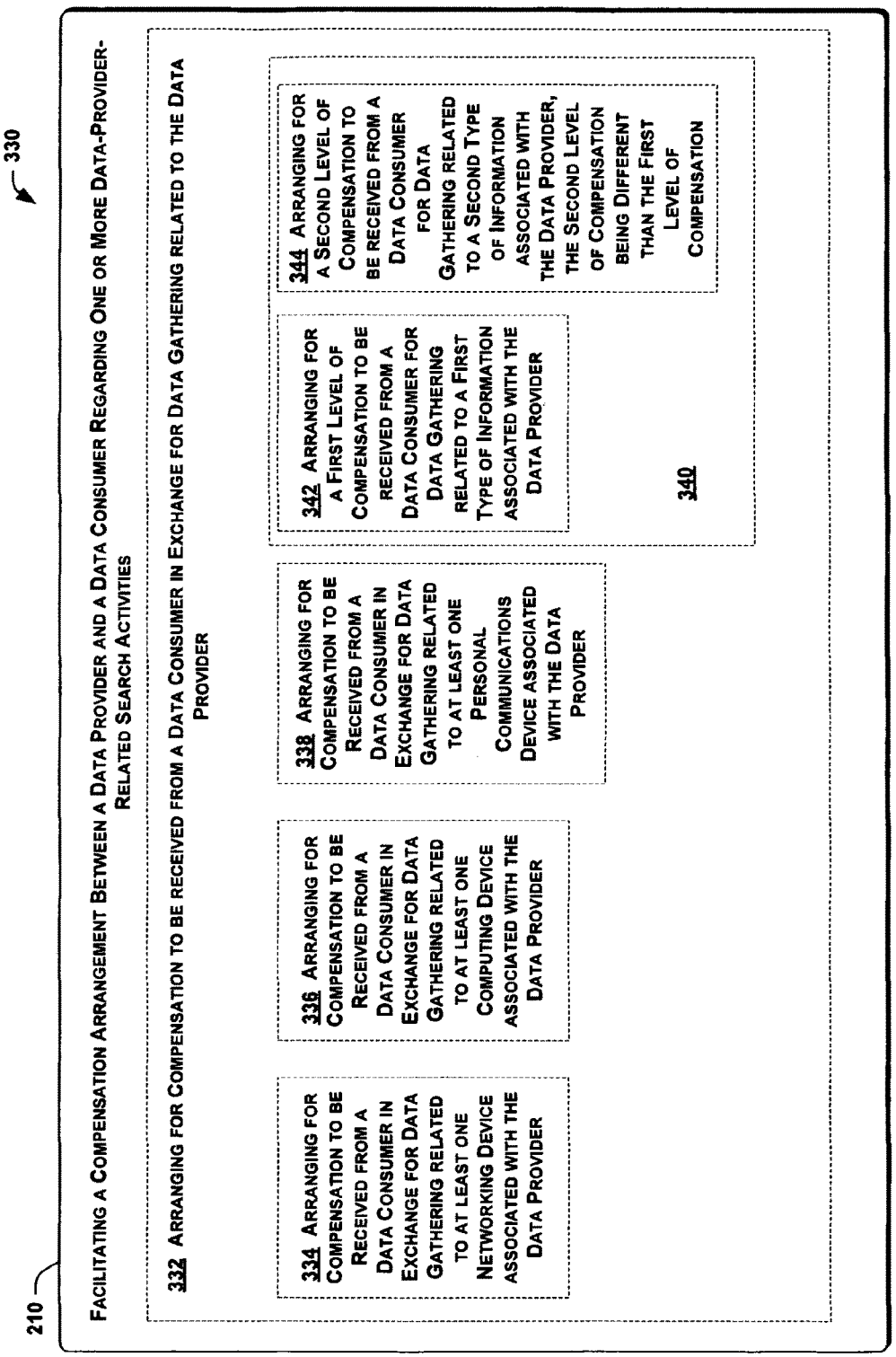

As further shown in FIG. 5, in further implementations, arranging for compensation to be received from a data consumer in exchange for data gathering related to the data provider (at 332) may include arranging for a first level of compensation to be received from a data consumer in exchange for data gathering related to a first type of information associated with the data provider at 342, and arranging for a second level of compensation to be received from the data consumer in exchange for data gathering related to a second type of information associated with the data provider, the second level of compensation being different than the first level of compensation at 344, or both at 340.

In some implementations, a plurality of compensation levels may be arranged in exchange for data gathering related to different types of information. For example, as shown in FIG. 6, in an implementation 350, facilitating a compensation arrangement between a data provider and a data consumer regarding one or more data-provider-related search activities (at 210 of FIG. 1) may include arranging for compensation to be received from a data consumer in exchange for data gathering related to the data provider at 332, and arranging for compensation to be received from a data consumer in exchange for data gathering related to the data provider (at 332) may include arranging for a plurality of compensation levels to be received from a data consumer in exchange for data gathering related to different types of information associated with the data provider at 352.

In some implementations, arranging for a plurality of compensation levels to be received from a data consumer in exchange for data gathering related to different types of information associated with the data provider (at 352) may include arranging for a plurality of compensation levels to be received from a data consumer in exchange for data gathering related to at least one of an affinity-related information, a health-related information, a consumer-related information, or a personal-characteristic information at 354.

More specifically, in some implementations, arranging for a plurality of compensation levels to be received from a data consumer in exchange for data gathering related to at least one of an affinity-related information, a health-related information, a consumer-related information, or a personal-characteristic information (at 354) may include one or more of: arranging for a relatively higher level of compensation to be received from a data consumer in exchange for data gathering related to an affinity-related information associated with the data provider in comparison with data gathering related to another information type at 356; arranging for a relatively higher level of compensation to be received from a data consumer in exchange for data gathering related to a health-related information associated with the data provider in comparison with data gathering related to another information type at 358; arranging for a relatively higher level of compensation to be received from a data consumer in exchange for data gathering related to a consumer-related information associated with the data provider in comparison with data gathering related to another information type at 360; and arranging for a relatively higher level of compensation to be received from a data consumer in exchange for data gathering related to a personal-characteristic-related information associated with the data provider in comparison with data gathering related to another information type at 362.

Figure 7:
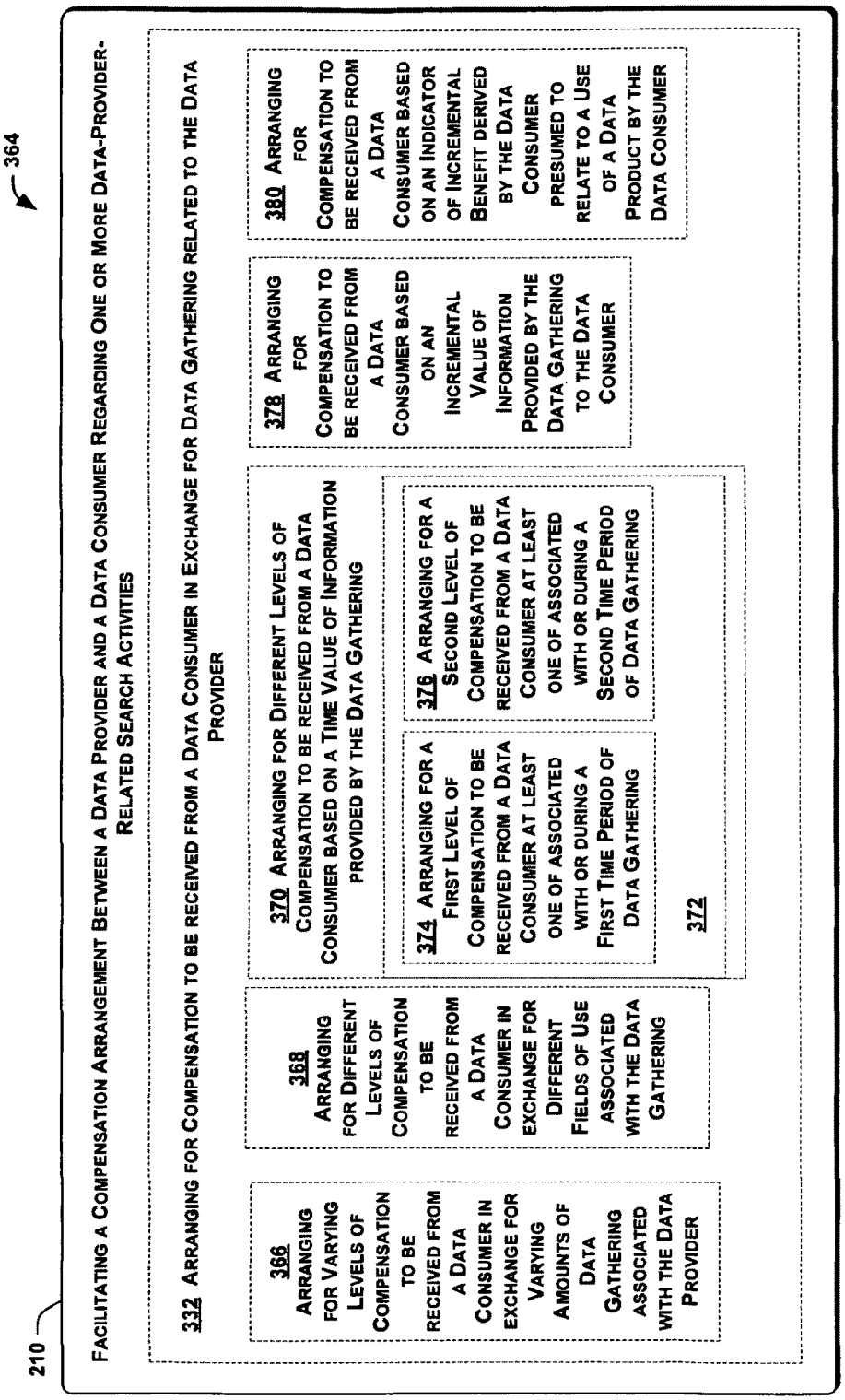

As shown in FIG. 7, in an implementation 364, facilitating a compensation arrangement between a data provider and a data consumer regarding one or more data-provider-related search activities (at 210 of FIG. 1) may include arranging for compensation to be received from a data consumer in exchange for data gathering related to the data provider at 332, and arranging for compensation to be received from a data consumer in exchange for data gathering related to the data provider (at 332) may include arranging for varying levels of compensation to be received from a data consumer in exchange for varying amounts of data gathering associated with the data provider at 366. Similarly, in other implementations, arranging for compensation to be received from a data consumer in exchange for data gathering related to the data provider (at 332) may include arranging for different levels of compensation to be received from a data consumer in exchange for different fields of use associated with the data gathering at 368.

In further implementations, arranging for compensation to be received from a data consumer in exchange for data gathering related to the data provider (at 332) may include arranging for different levels of compensation to be received from a data consumer based on a time value of information provided by the data gathering at 370. In some implementations, arranging for different levels of compensation to be received from a data consumer based on a time value of information provided by the data gathering (at 370) may include arranging for a first level of compensation to be received from a data consumer at least one of associated with or during a first time period of data gathering at 374, and arranging for a second level of compensation to be received from the data consumer at least one of associated with or during a second time period of data gathering at 376, or both at 372.

As further shown in FIG. 7, in some implementations, arranging for compensation to be received from a data consumer in exchange for data gathering related to the data provider (at 332) may include arranging for compensation to be received from a data consumer based on an incremental value of information provided by the data gathering to the data consumer at 378. For example, the compensation to be received from a data consumer may be based on the data consumer's increase in revenue, sales volume, traffic, or other indicator of incremental value (actual or presumed). Similarly, in some implementations, arranging for compensation to be received from a data consumer in exchange for data gathering related to the data provider (at 332) may include arranging for compensation to be received from a data consumer based on an indicator of incremental benefit derived by the data consumer presumed to relate to a use of a data product by the data consumer at 380. Again, for example, the compensation to be received from a data consumer may be based on the data consumer's increase in revenue, sales volume, traffic, or other indicator of incremental benefit derived by the data consumer presumed to relate to a use of a data product.

In further implementations, compensation to be received from a data consumer may be arranged based on information presumed to have been "eyeballed" (including information actually eyeballed) by the data provider. For example, as shown in FIG. 8, in another implementation 382, facilitating a compensation arrangement between a data provider and a data consumer regarding one or more data-provider-related search activities (at 210 of FIG. 1) may include arranging for compensation to be received from a data consumer in exchange for data gathering related to the data provider at 332, and arranging for compensation to be received from a data consumer in exchange for data gathering related to the data provider (at 332) may include arranging for compensation to be received from a data consumer in exchange for data gathering related to information presumed to have been eyeballed by the data provider at 384.

More specifically, in some implementations, arranging for compensation to be received from a data consumer in exchange for data gathering related to information presumed to have been eyeballed by the data provider (at 384) may include arranging for compensation to be received from a data consumer in exchange for data gathering related to a particular type of information presumed to have been eyeballed by the data provider at 386. In further implementations, arranging for compensation to be received from a data consumer in exchange for data gathering related to information presumed to have been eyeballed by the data provider (at 384) may include arranging for compensation to be received from a data consumer in exchange for data gathering related to an amount of time presumed to have been spent eyeballing the information by the data provider at 388. In still other implementations, arranging for compensation to be received from a data consumer in exchange for data gathering related to information presumed to have been eyeballed by the data provider (at 384) may include arranging for compensation to be received from a data consumer in exchange for data gathering related to a quantity of data presumed to have been eyeballed by the data provider at 390, and arranging for compensation to be received from a data consumer in exchange for data gathering presumably related to repeated eyeballing by the data provider at 392.

Figure 9:
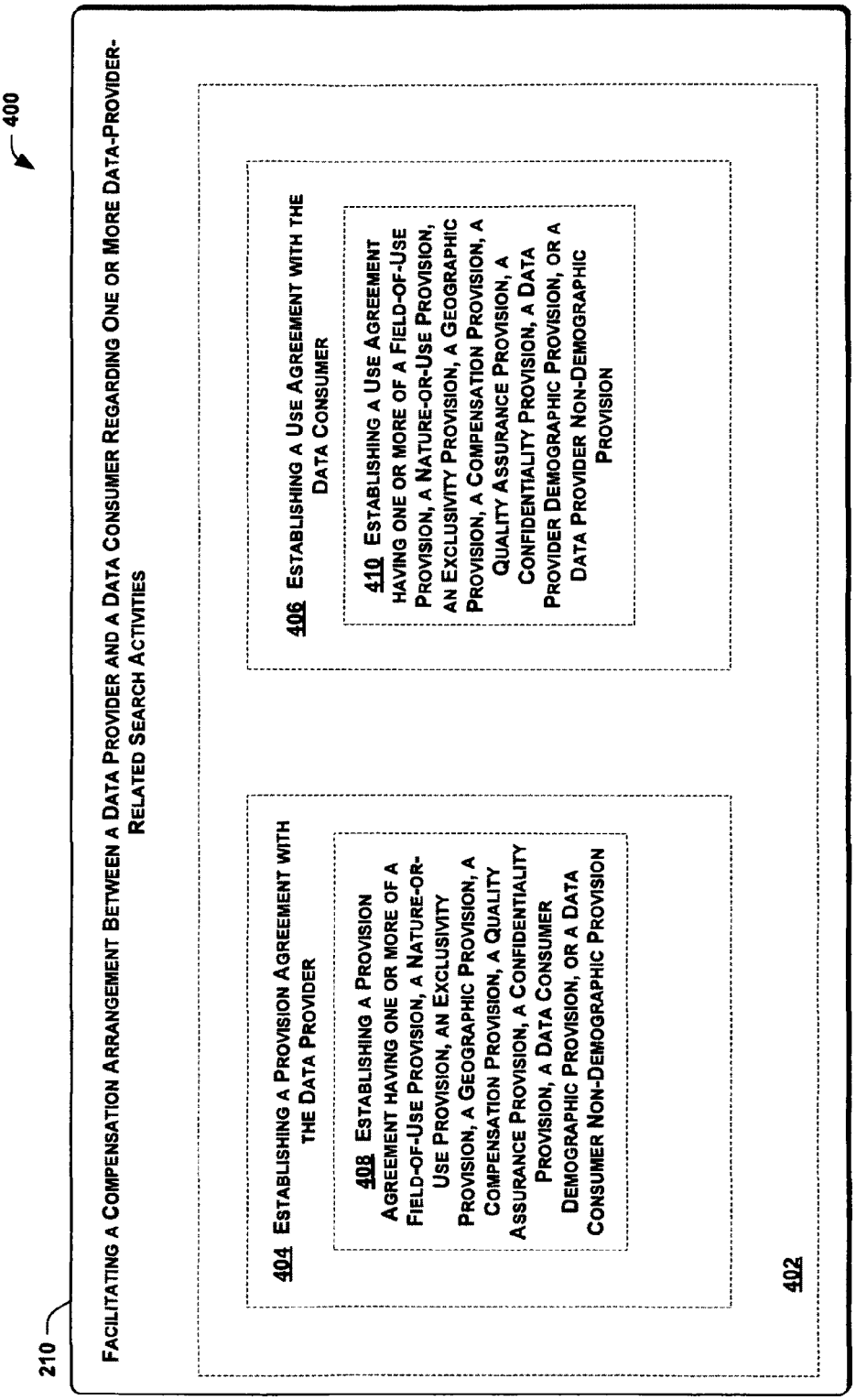

As shown in FIG. 9, in yet another implementation 400, facilitating a compensation arrangement between a data provider and a data consumer regarding one or more data-provider-related search activities (at 210 of FIG. 1) may include establishing a provision agreement with the data provider at 404, and establishing a use agreement with the data consumer at 406, or both at 402.

More specifically, in some implementations, establishing a provision agreement with the data provider (at 404) may include establishing a provision agreement having one or more of a field-of-use provision, a nature-of-use provision, an exclusivity provision, a geographic provision, a compensation provision, a quality assurance provision, a confidentiality provision, a data consumer demographic provision, or a data consumer non-demographic provision at 408. Similarly, in some implementations, establishing a use agreement with the data consumer (at 406) may include establishing a use agreement having one or more of a field-of-use provision, a nature-of-use provision, an exclusivity provision, a geographic provision, a compensation provision, a quality assurance provision, a confidentiality provision, a data provider demographic provision, or a data provider non-demographic provision at 410.

Figure 10:
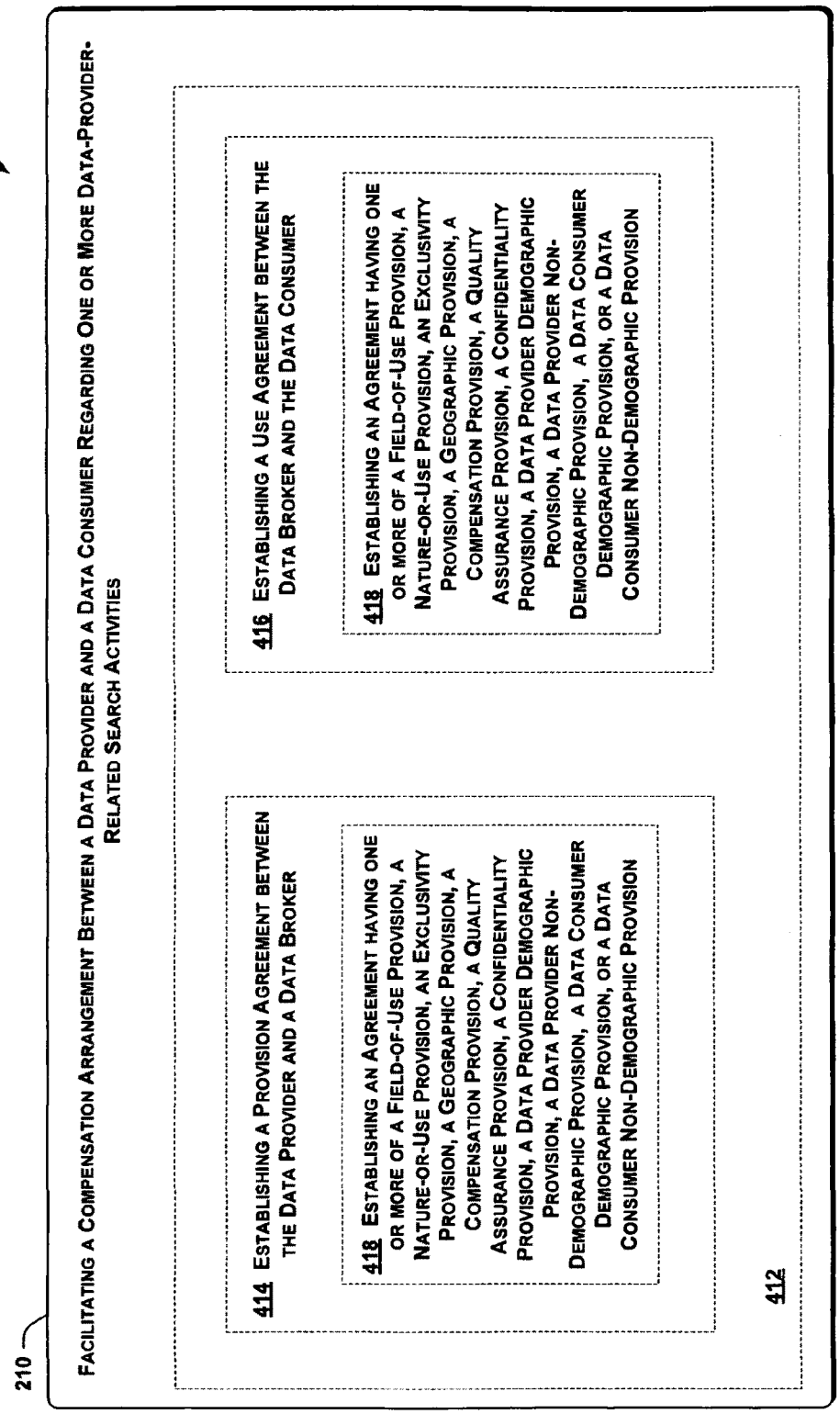

Similarly, as shown in FIG. 10, in another implementation 420, facilitating a compensation arrangement between a data provider and a data consumer regarding one or more data-provider-related search activities (at 210 of FIG. 1) may include establishing a provision agreement between the data provider and a data broker at 414, and establishing a use agreement between the data broker and the data consumer at 416, or both at 412. In further implementations, at least one of establishing a provision agreement between the data provider and a data broker (at 414) and establishing a use agreement between the data broker and the data consumer (at 416) may include establishing an agreement having one or more of a field-of-use provision, a nature-of-use provision, an exclusivity provision, a geographic provision, a compensation provision, a quality assurance provision, a confidentiality provision, a data consumer demographic provision, a data consumer non-demographic provision, a data provider demographic provision, or a data provider non-demographic provision at 418.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Figure 11:
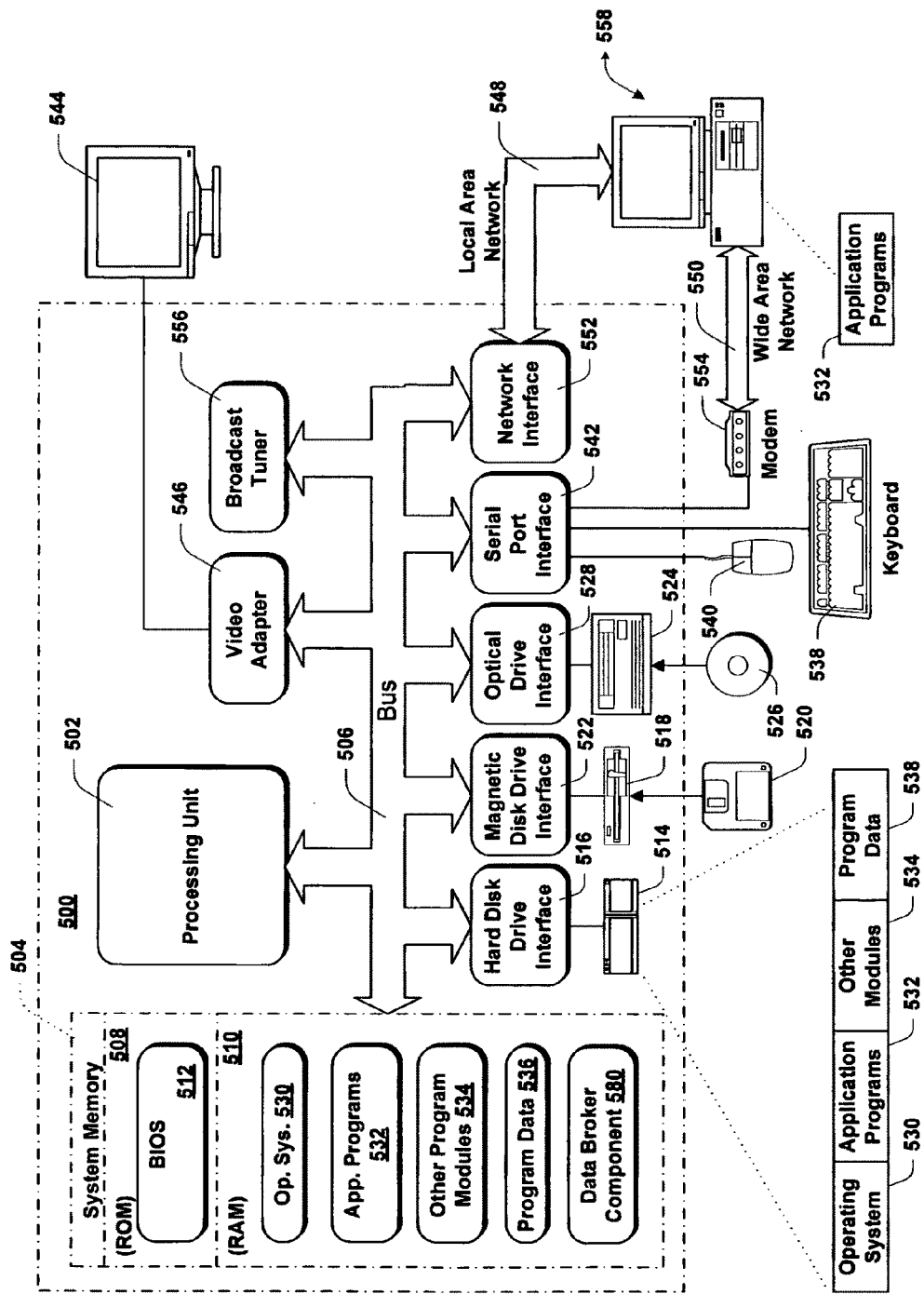
FIG. 11 is a schematic view of an exemplary computing device in accordance with another implementation of the present disclosure.

FIG. 11 shows an exemplary computing device 500 that can be used in accordance with the invention. The device 500 is typical of a computing device that can perform at least some of the functions and operations described above with respect to FIGS. 1 through 10. In this implementation, the computing device 500 includes one or more processors (or processing units) 502, a memory 504, and a bus 506 that couples various system components including the memory 504 to the one or more processors 502.

The bus 506 represents one or more of any of several types of bus structures, including a memory bus or memory controller, a peripheral bus, an accelerated graphics port, and a processor or local bus using any of a variety of bus architectures. In this implementation, the memory 504 includes read only memory (ROM) 508 and random access memory (RAM) 510. A basic input/output system (BIOS) 512, containing the basic routines that help to transfer information between elements within the computing device 500, such as during start-up, is stored in ROM 508.

The exemplary computing device 500 further includes a hard disk drive 514 for reading from and writing to a hard disk (not shown), and is connected to the bus 506 via a hard disk driver interface 516 (e.g., a SCSI, ATA, or other type of interface). A magnetic disk drive 518 for reading from and writing to a removable magnetic disk 520, is connected to the system bus 506 via a magnetic disk drive interface 522. Similarly, an optical disk drive 524 for reading from or writing to a removable optical disk 526 such as a CD ROM, DVD, or other optical media, connected to the bus 506 via an optical drive interface 528. The drives and their associated computer-readable media provide nonvolatile storage of computer readable instructions, data structures, program modules and other data for the computing device 500. Although the exemplary computing device 500 described herein employs a hard disk, a removable magnetic disk 520 and a removable optical disk 526, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 11, a number of program modules may be stored on the memory 504 (e.g. the ROM 508 or the RAM 510) including an operating system 530, one or more application programs 532, other program modules 534, and program data 536. Alternately, these program modules may be stored on other computer-readable media, including the hard disk, the magnetic disk 520, or the optical disk 526. For purposes of illustration, programs and other executable program components, such as the operating system 530, are illustrated in FIG. 9 as discrete blocks, although it is recognized that such programs and components reside at various times in different storage components of the computing device 500, and are executed by the processor(s) 502 of the computing device 500.

A user may enter commands and information into the computing device 500 through input devices such as a keyboard 538 and a pointing device 540. Other input devices (not shown) may include a microphone, joystick, game pad, satellite dish, scanner, or the like. These and other input devices are connected to the processing unit 502 through an interface 542 that is coupled to the system bus. A monitor 544 or other type of display device is also connected to the bus 506 via an interface, such as a video adapter 546. In addition to the monitor, personal computers typically include other peripheral output devices (not shown) such as speakers and printers.

The computing device 500 may operate in a networked environment using logical connections to one or more remote computers (or servers) 558, such as those operated by one or more of the data providers 110 and data consumers 170. Such remote computers (or servers) 558 may be a personal computer, a server, a router, a network PC, a peer device or other common network node, and may include many or all of the elements described above relative to computing device 500. The logical connections depicted in FIG. 9 include a local area network (LAN) 548 and a wide area network (WAN) 550. Such networking environments are commonplace in offices, enterprise-wide computer networks, intranets, and the Internet. In this embodiment, the computing device 500 also includes one or more broadcast tuners 556. The broadcast tuner 556 may receive broadcast signals directly (e.g., analog or digital cable transmissions fed directly into the tuner 556) or via a reception device (e.g., via an antenna, a satellite dish, etc.).

When used in a LAN networking environment, the computing device 500 may be connected to the local network 548 through a network interface (or adapter) 552. When used in a WAN networking environment, the computing device 500 typically includes a modem 554 or other means for establishing communications over the wide area network 550, such as the Internet. The modem 554, which may be internal or external, may be connected to the bus 506 via the serial port interface 542. In a networked environment (e.g. environment 100 of FIG. 1), program modules depicted relative to the computing device 500, or portions thereof, may be stored in a remote memory storage device.

As further shown in FIG. 11, a data broker component 580 may be stored in the memory 504 of the computing device 500. The data broker component 580 is operable to perform one or more implementations of data brokering in accordance with the present disclosure. More specifically, the data broker component 580 may be operable to perform one or more implementations of methods of brokering data described above with reference to FIGS. 1 through 10.

Various methods, systems, and techniques have been described herein in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A computer-implemented method, comprising:
    facilitating a compensation arrangement between a data provider and a data consumer regarding one or more data-provider-related search activities, wherein the facilitating is at least partially performed by a data broker, wherein the data broker performs an analysis to determine a potential value of data, wherein the potential value includes a time value of the data, wherein the data includes the data requested by the data consumer from the one or more data-provider-related search activities, and wherein the facilitating is at least partially implemented using one or more processing devices.

2. The computer-implemented method of claim 1, wherein facilitating a compensation arrangement between a data provider and a data consumer regarding one or more data-provider-related search activities comprises:
    negotiating the compensation arrangement between the data provider and the data consumer.

3. The computer-implemented method of claim 2, wherein negotiating the compensation arrangement between the data provider and the data consumer comprises:
    transmitting one or more offers from a data broker to the data provider for a first compensation in exchange for a data product; and
    transmitting one or more offers from the data broker to the data consumer for a second compensation in exchange for the data product.

4. The computer-implemented method of claim 3, wherein transmitting one or more offers from the data broker to the data consumer for a second compensation in exchange for the data product comprises:
    transmitting one or more offers from the data broker to the data consumer for the second compensation that is greater than the first compensation.

5. The computer-implemented method of claim 2, wherein negotiating the compensation arrangement between the data provider and the data consumer comprises:
    receiving at least one acceptance at the data broker from at least one of the data provider or the data consumer.

6. The computer-implemented method of claim 2, wherein negotiating the compensation arrangement between the data provider and the data consumer comprises:
    receiving at least one counter-offer at the data broker from at least one of the data provider or the data consumer.

7. The computer-implemented method of claim 2, wherein negotiating the compensation arrangement between the data provider and the data consumer comprises:
    performing one or more negotiation activities, wherein performing one or more negotiation activities includes at least one of:
    transmitting a first offer from a data broker to the data provider for a first compensation in exchange for the data product;
    receiving at least one of an acceptance or a counter-offer at the data broker from the data provider;
    transmitting a second offer from the data broker to the data consumer for a second compensation in exchange for the data product; or
    receiving at least one of an acceptance or a counter-offer at the data broker from the data consumer.

8. The computer-implemented method of claim 7, wherein performing one or more negotiation activities comprises:
    automatically iteratively performing one or more negotiation activities.

9. The computer-implemented method of claim 2, wherein negotiating the compensation arrangement between the data provider and the data consumer further comprises:
    automatically negotiating the compensation arrangement between the data provider and the data consumer.

10. The computer-implemented method of claim 1, wherein facilitating a compensation arrangement between a data provider and a data consumer regarding one or more data-provider-related search activities comprises:
    arranging for compensation to be received from a data consumer in exchange for data gathering related to the data provider.

11. The computer-implemented method of claim 10, wherein arranging for compensation to be received from a data consumer in exchange for data gathering related to the data provider comprises:
   arranging for compensation to be received from a data consumer in exchange for data gathering related to at least one networking device associated with the data provider.

12. The computer-implemented method of claim 10, wherein arranging for compensation to be received from a data consumer in exchange for data gathering related to the data provider comprises:
   arranging for compensation to be received from a data consumer in exchange for data gathering related to at least one computing device associated with the data provider.

13. The computer-implemented method of claim 10, wherein arranging for compensation to be received from a data consumer in exchange for data gathering related to the data provider comprises:
   arranging for compensation to be received from a data consumer in exchange for data gathering related to at least one personal communications device associated with the data provider.

14. The computer-implemented method of claim 10, wherein arranging for compensation to be received from a data consumer in exchange for data gathering related to the data provider comprises:
   arranging for a first level of compensation to be received from a data consumer in exchange for data gathering related to a first type of information associated with the data provider; and
   arranging for a second level of compensation to be received from the data consumer in exchange for data gathering related to a second type of information associated with the data provider, the second level of compensation being different than the first level of compensation.

15. The computer-implemented method of claim 10, wherein arranging for compensation to be received from a data consumer in exchange for data gathering related to the data provider comprises:
   arranging for a plurality of compensation levels to be received from a data consumer in exchange for data gathering related to different types of information associated with the data provider.

16. The computer-implemented method of claim 15, wherein arranging for a plurality of compensation levels to be received from a data consumer in exchange for data gathering related to different types of information associated with the data provider comprises:
   arranging for a plurality of compensation levels to be received from a data consumer in exchange for data gathering related to at least one of an affinity-related information, a health-related information, a consumer-related information, or a personal-characteristic information.

17. The computer-implemented method of claim 16, wherein arranging for a plurality of compensation levels to be received from a data consumer in exchange for data gathering related to at least one of an affinity-related information, a health-related information, a consumer-related information, or a personal-characteristic information comprises:
   arranging for a relatively higher level of compensation to be received from a data consumer in exchange for data gathering related to an affinity-related information associated with the data provider in comparison with data gathering related to another information type.

18. The computer-implemented method of claim 16, wherein arranging for a plurality of compensation levels to be received from a data consumer in exchange for data gathering related to at least one of an affinity-related information, a health-related information, a consumer-related information, or a personal-characteristic information comprises:
   arranging for a relatively higher level of compensation to be received from a data consumer in exchange for data gathering related to a health-related information associated with the data provider in comparison with data gathering related to another information type.

19. The computer-implemented method of claim 16, wherein arranging for a plurality of compensation levels to be received from a data consumer in exchange for data gathering related to at least one of an affinity-related information, a health-related information, a consumer-related information, or a personal-characteristic information comprises:
   arranging for a relatively higher level of compensation to be received from a data consumer in exchange for data gathering related to a consumer-related information associated with the data provider in comparison with data gathering related to another information type.

20. The computer-implemented method of claim 16, wherein arranging for a plurality of compensation levels to be received from a data consumer in exchange for data gathering related to at least one of an affinity-related information, a health-related information, a consumer-related information, or a personal-characteristic information comprises:
   arranging for a relatively higher level of compensation to be received from a data consumer in exchange for data gathering related to a personal-characteristic-related information associated with the data provider in comparison with data gathering related to another information type.

21. The computer-implemented method of claim 10, wherein arranging for compensation to be received from a data consumer in exchange for data gathering related to the data provider comprises:
   arranging for varying levels of compensation to be received from a data consumer in exchange for varying amounts of data gathering associated with the data provider.

22. The computer-implemented method of claim 10, wherein arranging for compensation to be received from a data consumer in exchange for data gathering related to the data provider comprises:
   arranging for different levels of compensation to be received from a data consumer in exchange for different fields of use associated with the data gathering.

23. The computer-implemented method of claim 10, wherein arranging for compensation to be received from a data consumer in exchange for data gathering related to the data provider comprises:
   arranging for different levels of compensation to be received from a data consumer based on a time value of information provided by the data gathering.

24. The computer-implemented method of claim 23, wherein arranging for different levels of compensation to be received from a data consumer based on a time value of information provided by the data gathering comprises:
   arranging for a first level of compensation to be received from a data consumer at least one of associated with or during a first time period of data gathering; and
   arranging for a second level of compensation to be received from the data consumer at least one of associated with or during a second time period of data gathering.

25. The computer-implemented method of claim 10, wherein arranging for compensation to be received from a data consumer in exchange for data gathering related to the data provider comprises:
- arranging for compensation to be received from a data consumer based on an incremental change in value of a data consumer's revenue based on the information provided by the data gathering to the data consumer.

26. The computer-implemented method of claim 10, wherein arranging for compensation to be received from a data consumer in exchange for data gathering related to the data provider comprises:
- arranging for compensation to be received from a data consumer based on an incremental change in a data consumer's sales volume based on the information provided by the data gathering to the data consumer.

27. The computer-implemented method of claim 10, wherein arranging for compensation to be received from a data consumer in exchange for data gathering related to the data provider comprises:
- arranging for compensation to be received from a data consumer in exchange for data gathering related to information presumed to have been eyeballed by the data provider.

28. The computer-implemented method of claim 27, wherein arranging for compensation to be received from a data consumer in exchange for data gathering related to information presumed to have been eyeballed by the data provider comprises:
- arranging for compensation to be received from a data consumer in exchange for data gathering related to a particular type of information presumed to have been eyeballed by the data provider.

29. The computer-implemented method of claim 27, wherein arranging for compensation to be received from a data consumer in exchange for data gathering related to information presumed to have been eyeballed by the data provider comprises:
- arranging for compensation to be received from a data consumer in exchange for data gathering related to an amount of time presumed to have been spent eyeballing the information by the data provider.

30. The computer-implemented method of claim 27, wherein arranging for compensation to be received from a data consumer in exchange for data gathering related to information presumed to have been eyeballed by the data provider comprises:
- arranging for compensation to be received from a data consumer in exchange for data gathering related to a quantity of data presumed to have been eyeballed by the data provider.

31. The computer-implemented method of claim 27, wherein arranging for compensation to be received from a data consumer in exchange for data gathering related to information presumed to have been eyeballed by the data provider comprises:
- arranging for compensation to be received from a data consumer in exchange for data gathering presumably related to repeated eyeballing by the data provider.

32. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a cellular phone.

33. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a personal data assistant (PDA).

34. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a laptop computer.

35. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a navigational device.

36. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a notebook computer.

37. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a desktop computer.

38. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a server computer.

39. The computer-implemented method of claim 10, wherein arranging for compensation to be received from a data consumer in exchange for data gathering related to the data provider comprises:
- arranging for compensation to be received from a data consumer in exchange for data gathering related to at least one networking device associated with the data provider, wherein the at least one networking device includes at least a switch.

40. The computer-implemented method of claim 10, wherein arranging for compensation to be received from a data consumer in exchange for data gathering related to the data provider comprises:
arranging for compensation to be received from a data consumer in exchange for data gathering related to at least one networking device associated with the data provider, wherein the at least one networking device includes at least a security appliance.

41. The computer-implemented method of claim 10, wherein arranging for compensation to be received from a data consumer in exchange for data gathering related to the data provider comprises:
arranging for compensation to be received from a data consumer in exchange for data gathering related to at least one networking device associated with the data provider, wherein the at least one networking device includes at least a firewall.

42. The computer-implemented method of claim 1, wherein facilitating a compensation arrangement between a data provider and a data consumer regarding one or more data-provider-related search activities comprises:
establishing a provision agreement with the data provider; and
establishing a use agreement with the data consumer.

43. The computer-implemented method of claim 42, wherein establishing a provision agreement with the data provider comprises:
establishing a provision agreement having one or more of a field-of-use provision, a nature-of-use provision, an exclusivity provision, a geographic provision, a compensation provision, a quality assurance provision, a confidentiality provision, a data consumer demographic provision, or a data consumer non-demographic provision.

44. The computer-implemented method of claim 42, wherein establishing a use agreement with the data consumer comprises:
establishing a use agreement having one or more of a field-of-use provision, a nature-of-use provision, an exclusivity provision, a geographic provision, a compensation provision, a quality assurance provision, a confidentiality provision, a data provider demographic provision, or a data provider non-demographic provision.

45. The computer-implemented method of claim 1, wherein facilitating a compensation arrangement between a data provider and a data consumer regarding one or more data-provider-related search activities comprises:
establishing a provision agreement between the data provider and a data broker; and
establishing a use agreement between the data broker and the data consumer.

46. The computer-implemented method of claim 35, wherein at least one of establishing a provision agreement between the data provider and a data broker and establishing a use agreement between the data broker and the data consumer comprises:
establishing an agreement having one or more of a field-of-use provision, a nature-of-use provision, an exclusivity provision, a geographic provision, a compensation provision, a quality assurance provision, a confidentiality provision, a data consumer demographic provision, a data consumer non-demographic provision, a data provider demographic provision, or a data provider non-demographic provision.

47. The computer-implemented method of claim 1, further comprising:
providing a data product to the data consumer in accordance with the compensation arrangement.

48. The computer-implemented method of claim 1, further comprising:
monitoring a performance of the data consumer.

49. The computer-implemented method of claim 1, further comprising:
receiving compensation from the data consumer in accordance with the compensation arrangement; and
compensating the data provider in accordance with the compensation arrangement.

50. The computer-implemented method of claim 1, wherein facilitating a compensation arrangement between a data provider and a data consumer regarding one or more data-provider-related search activities, wherein the facilitating is at least partially performed by a data broker comprises:
facilitating the compensation arrangement between the data provider and the data consumer regarding the one or more data-provider-related search activities, wherein the facilitating is at least partially performed by the data broker, wherein the data broker performs an analysis to determine a potential value of the data, wherein the potential value of the data is determined by performing a mathematical manipulation of the data.

51. A system, comprising:
circuitry for facilitating a compensation arrangement between a data provider and a data consumer regarding one or more data-provider-related search activities, wherein the facilitating is at least partially performed by a data broker, wherein the data broker performs an analysis to determine a potential value of data, wherein the potential value includes a time value of the data, wherein the data includes the data requested by the data consumer from the one or more data-provider-related search activities, and wherein the circuitry for facilitating is at least partially implemented using hardware.

52. A non-transitory signal-bearing medium bearing one or more instructions that, when executed by an executing component, perform a method comprising:
facilitating a compensation arrangement between a data provider and a data consumer regarding one or more data-provider-related search activities, wherein the facilitating is at least partially performed by a data broker, wherein the data broker performs an analysis to determine a potential value of data, wherein the potential value includes a time value of the data, wherein the data includes the data requested by the data consumer from the one or more data-provider-related search activities.

53. A system, comprising:
an executing component;
a memory operatively coupled to the executing component; and
an arrangements component accessible by the executing component, the arrangements component operable to facilitate a compensation arrangement between a data provider and a data consumer regarding one or more data provider-related search activities, wherein the facilitate is at least partially performed by a data broker, wherein the data broker performs an analysis to determine a potential value of data, wherein the potential value includes a time value of the data, wherein the data includes the data requested by the data consumer from the one or more data-provider-related search activities.

54. The system of claim 53, wherein the executing component comprises:

at least one of a computer, a controller, a processor, a programmable device, an application specific integrated circuit (ASIC), a field programmable gate array (FPGA), or a digital signal processor (DSP).

55. The system of claim 53, wherein the memory comprises:
at least one of a random access memory (RAM), a read only memory (ROM), an electrically erasable programmable ROM (EEPROM), a flash memory, a compact disk ROM (CD-ROM), a digital versatile disk (DVD), an optical storage device, a magnetic storage device, a cassette, a tape, a magnetic disk, a paper storage medium, and/or a punch card.

56. The system of claim 53, wherein the arrangements component operable to facilitate a compensation arrangement between a data provider and a data consumer regarding one or more data provider-related search activities comprises:
a negotiation component operable to negotiate the compensation arrangement between the data provider and the data consumer.

57. The system of claim 56, wherein the negotiation component operable to negotiate the compensation arrangement between the data provider and the data consumer comprises:
a first transmission component operable to transmit one or more offers from a data broker to the data provider for a first compensation in exchange for a data product; and
a second transmission component operable to transmit one or more offers from the data broker to the data consumer for a second compensation in exchange for the data product.

58. The system of claim 57, wherein the second transmission component operable to transmit one or more offers from the data broker to the data consumer for a second compensation in exchange for the data product comprises:
a second transmission component operable to transmit one or more offers from the data broker to the data consumer for the second compensation that is greater than the first compensation.

59. The system of claim 53, wherein arrangements component operable to facilitate a compensation arrangement between a data provider and a data consumer regarding one or more data-provider-related search activities comprises:
a component operable to receive at least one acceptance at the data broker from at least one of the data provider or the data consumer.

60. The system of claim 53, wherein arrangements component operable to facilitate a compensation arrangement between a data provider and a data consumer regarding one or more data-provider-related search activities comprises:
a sub-component operable to receive at least one counter-offer at the data broker from at least one of the data provider or the data consumer.

61. The system of claim 53, wherein arrangements component operable to facilitate a compensation arrangement between a data provider and a data consumer regarding one or more data-provider-related search activities comprises:
a negotiation component operable to perform one or more negotiation activities, wherein the negotiation component includes at least one of:
a transmission component operable to transmit a first offer from a data broker to the data provider for a first compensation in exchange for the data product;
a reception component operable to receive at least one of an acceptance or a counter-offer at the data broker from the data provider;
a transmission component operable to transmit a second offer from the data broker to the data consumer for a second compensation in exchange for the data product; or
a reception component operable to receive at least one of an acceptance or a counter-offer at the data broker from the data consumer.

62. The system of claim 61, wherein the negotiation component operable to perform one or more negotiation activities comprises:
an auto-negotiation component operable to automatically perform one or more negotiation activities.

63. The system of claim 53, wherein arrangements component operable to facilitate a compensation arrangement between a data provider and a data consumer regarding one or more data-provider-related search activities comprises:
an auto-negotiation component operable to automatically negotiate the compensation arrangement between the data provider and the data consumer.

64. The system of claim 53, wherein arrangements component operable to facilitate a compensation arrangement between a data provider and a data consumer regarding one or more data-provider-related search activities comprises:
a compensation component operable to receive compensation from a data consumer in exchange for data gathering related to the data provider.

65. The system of claim 64, wherein the compensation component operable to receive compensation from a data consumer in exchange for data gathering related to the data provider comprises:
a compensation component operable to receive compensation from a data consumer in exchange for data gathering related to at least one networking device associated with the data provider.

66. The system of claim 64, wherein the compensation component operable to receive compensation from a data consumer in exchange for data gathering related to the data provider comprises:
a compensation component operable to receive compensation from a data consumer in exchange for data gathering related to at least one computing device associated with the data provider.

67. The system of claim 64, wherein the compensation component operable to receive compensation from a data consumer in exchange for data gathering related to the data provider comprises:
a compensation component operable to receive compensation from a data consumer in exchange for data gathering related to at least one personal communications device associated with the data provider.

68. The system of claim 64, wherein the compensation component operable to receive compensation from a data consumer in exchange for data gathering related to the data provider comprises:
a first component operable to arrange for a first level of compensation to be received from a data consumer in exchange for data gathering related to a first type of information associated with the data provider; and
a second component operable to arrange for a second level of compensation to be received from the data consumer in exchange for data gathering related to a second type of information associated with the data provider, the second level of compensation being different than the first level of compensation.

69. The system of claim 64, wherein the compensation component operable to receive compensation from a data consumer in exchange for data gathering related to the data provider comprises:
    a component operable to arrange for a plurality of compensation levels to be received from a data consumer in exchange for data gathering related to at least one of an affinity-related information, a health-related information, a consumer-related information, or a personal-characteristic information.

70. The system of claim 69, wherein the component operable to arrange for a plurality of compensation levels to be received from a data consumer in exchange for data gathering related to at least one of an affinity-related information, a health-related information, a consumer-related information, or a personal-characteristic information comprises:
    a component operable to arrange for a relatively higher level of compensation to be received from a data consumer in exchange for data gathering related to an affinity-related information associated with the data provider in comparison with data gathering related to another information type.

71. The system of claim 69, wherein the component operable to arrange for a plurality of compensation levels to be received from a data consumer in exchange for data gathering related to at least one of an affinity-related information, a health-related information, a consumer-related information, or a personal-characteristic information comprises:
    a component operable to arrange for a relatively higher level of compensation to be received from a data consumer in exchange for data gathering related to a health-related information associated with the data provider in comparison with data gathering related to another information type.

72. The system of claim 69, wherein the component operable to arrange for a plurality of compensation levels to be received from a data consumer in exchange for data gathering related to at least one of an affinity-related information, a health-related information, a consumer-related information, or a personal-characteristic information comprises:
    a component operable to arrange for a relatively higher level of compensation to be received from a data consumer in exchange for data gathering related to a consumer-related information associated with the data provider in comparison with data gathering related to another information type.

73. The system of claim 69, wherein the component operable to arrange for a plurality of compensation levels to be received from a data consumer in exchange for data gathering related to at least one of an affinity-related information, a health-related information, a consumer-related information, or a personal-characteristic information comprises:
    a component operable to arrange for a relatively higher level of compensation to be received from a data consumer in exchange for data gathering related to a personal-characteristic-related information associated with the data provider in comparison with data gathering related to another information type.

74. The system of claim 64, wherein the compensation component operable to receive compensation from a data consumer in exchange for data gathering related to the data provider comprises:
    a component operable to arrange for varying levels of compensation to be received from a data consumer in exchange for varying amounts of data gathering associated with the data provider.

75. The system of claim 64, wherein the compensation component operable to receive compensation from a data consumer in exchange for data gathering related to the data provider comprises:
    a component operable to arrange for different levels of compensation to be received from a data consumer in exchange for different fields of use associated with the data gathering.

76. The system of claim 64, wherein the compensation component operable to receive compensation from a data consumer in exchange for data gathering related to the data provider comprises:
    a component operable to arrange for different levels of compensation to be received from a data consumer based on a time value of information provided by the data gathering.

77. The system of claim 76, wherein the component operable to arrange for different levels of compensation to be received from a data consumer based on a time value of information provided by the data gathering comprises:
    a component operable to arrange for a second level of compensation to be received from a data consumer at least one of associated with or during a second time period of data gathering.

\* \* \* \* \*